(No Model.)
T. R. CRANE.
GRAIN DRILL TUBE.
No. 372,126. Patented Oct. 25, 1887.
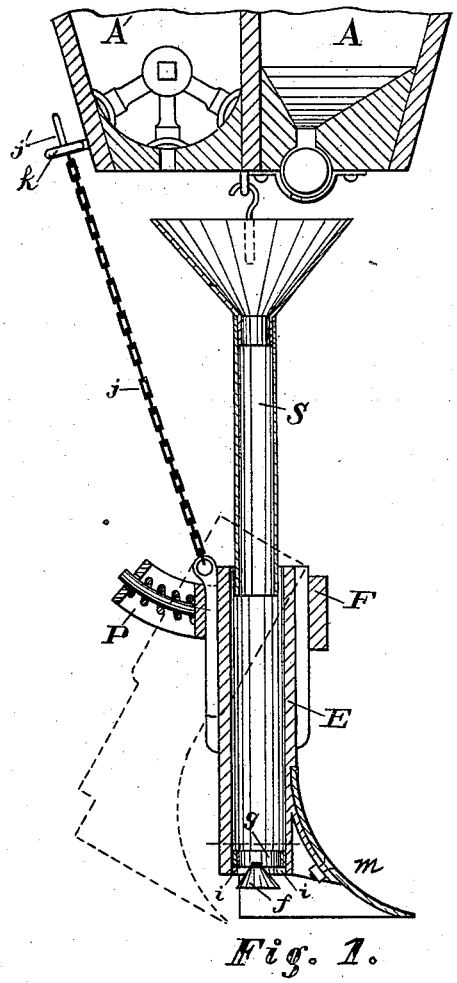
Fig. 1.
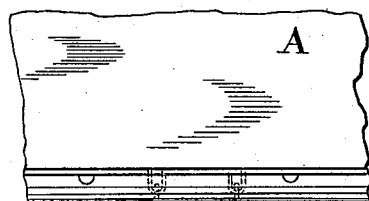
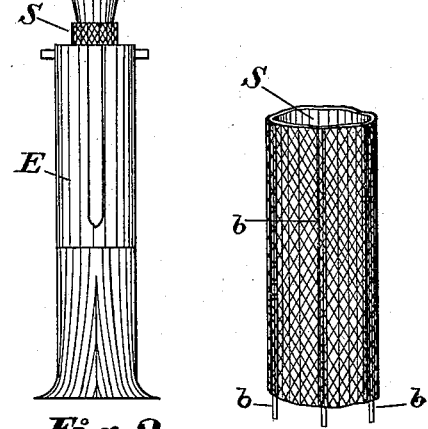
Fig. 2. Fig. 5.
Fig. 7.
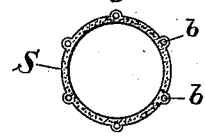
Fig. 6.
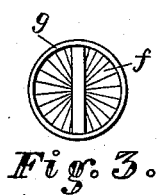
Fig. 3.
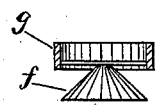
Fig 4.
WITNESSES:
R. L. Clemmitt.
John E. Morris
INVENTOR:
Thos. R. Crane
BY Chas. B. Mann
ATTORNEY.
N. PETERS, Photo-Lithographer, Washington, D. C.

UNITED STATES PATENT OFFICE.

THOMAS R. CRANE, OF HEATHSVILLE, VIRGINIA.

GRAIN-DRILL TUBE.

SPECIFICATION forming part of Letters Patent No. 372,126, dated October 25, 1887.

Application filed August 24, 1887. Serial No. 247,719. (No model.)

*To all whom it may concern:*

Be it known that I, THOMAS R. CRANE, a citizen of the United States, residing at Heathsville, in the county of Northumberland and State of Virginia, have invented certain new and useful Improvements in Grain-Drill Tubes, of which the following is a specification.

My invention relates to improvements in drill-tubes for grain and fertilizer drills.

In the accompanying drawings, Figure 1 is a vertical section of the hoppers and drill-tube, the latter being down in position for work. Fig. 2 is a front view of the same parts, the drill-tube, however, being raised. Figs. 3 and 4 are views of the detachable spreader-disk. Fig. 5 is a view of the improved flexible tube which conveys the grain from the hopper to the drill-tube. Fig. 6 is an end view of the improved flexible tube. Fig. 7 is a cross-section of the drill-tube.

The letters $A'$ $A^2$ designate hoppers for grain and fertilizer. Each hopper has a suitable feed device, not necessary to describe here.

The letter E designates an ordinary drill-tube, such as are attached to grain and fertilizer drills. This tube has a shoe, $m$, which opens the furrow for the grain. Each drill-tube E is raised and lowered vertically by a chain, $j$, having at its upper end a ring, $j'$, which, when the tube is down, rests on a suitable support, $k$, back of the hopper. Each drill-tube E is attached to a horizontal crosswise bar, F, by a yielding clamp, P, which admits of the tube moving back from the bar to a limited extent, as indicated in broken lines in Fig. 1. The said bar and clamp are fully shown and described in United States Letters Patent No. 363,605, granted me May 24, 1887.

I employ an improved flexible tube, S, to convey the grain or fertilizer from the hopper to the drill-tube, the top of which latter it is to fill and fit snug and close. This tube S may be made of woven cotton, and may be covered or not, inside or out, with partly-vulcanized rubber. It must be flexible, however, so as to bend or yield when the drill-tube E moves back, as indicated in Fig. 1. Rubber and woven-fabric tubes, as heretofore made, from usage kink, bend short, and collapse, and soon become worthless, for the reason that the "kinks" hinder the downflow of the grain or fertilizer. In order to obviate this I provide the tubes with straight elastic wires $b$, which extend lengthwise of the tube, as shown in Figs. 5 and 6. These wires are inserted or embedded in the fabric of the tube, and serve to keep the tube from kinking, while affording sufficient flexibility to permit it to bend.

A detachable spreader-disk, $f$, having a ring, $g$, is provided and combined with the drill-tube, and also with the special conveyer-tube and drill-tube. The disk $f$ is convex on its upper side, and is attached to a ring or band, $g$, so that grain passing down through the ring will strike on the convex top of the disk, and thereby be spread or deflected even all around. The disk-ring fits neatly within the drill-tube E, being of size externally to fill it, and is seated loosely on the lugs $i$, fixed to the internal wall of the drill-tube at the lower end, as shown. The grain-spreader disk $f$ is so constructed that it may be lifted out of the top of the drill-tube. When placing it in position, the conveyer-tube S must first be withdrawn from the top of the drill-tube, and then the disk and ring inserted in the top of the drill-tube, when they will drop and be seated on the lugs $i$. The flexible conveyer-tube, having wires extending lengthwise, will always fill the top of the drill-tube and properly fit therein. As the construction of this tube S insures that it will always be open for the free downflow of the grain, it follows that the grain will be delivered fairly into the drill-tube E, and then the spreader-disk $f$ in the latter will effect the best delivery of the grain in the open furrow in the ground.

In United States Letters Patent No. 364,577, granted me June 7, 1887, is shown a convex disk attached to a ring provided with side pins, and is secured by the well-known bayonet-clasp coupling to a conveyer-tube, (not a drill-tube,) which is inserted in a drill-tube. This patented device differs materially from that here shown. In this the ring has no side pins, is not secured by a "coupling" of any kind, but sits loosely in a tube. It is not in a "conveyer-tube;" but special provision is made for it in the drill-tube.

Having described my invention, I claim and desire to secure by Letters Patent of the United States—

1. The combination of a drill-tube, E, having a shoe, m, and provided at its lower end with internal lugs, i, and a convex disk, f, secured to a ring, g, which fits within the tube and is seated loosely on the said lugs.

2. The combination of a drill-tube, E, provided at its lower end with internal lugs, i, a convex disk, f, secured to a ring, g, which fits within the tube and is seated loosely on the said lugs, and a conveyer-tube, S, made of flexible material, and provided with elastic wires extending lengthwise, and fitting in and filling the top of the drill-tube.

In testimony whereof I affix my signature in the presence of two witnesses.

THOMAS R. CRANE.

Witnesses:
JNO. T. MADDOX,
JNO. SANDERSON.